United States Patent
van Rietschote et al.

(10) Patent No.: US 7,543,174 B1
(45) Date of Patent: *Jun. 2, 2009

(54) PROVIDING HIGH AVAILABILITY FOR AN APPLICATION BY RAPIDLY PROVISIONING A NODE AND FAILING OVER TO THE NODE

(75) Inventors: Hans F. van Rietschote, Sunnyvale, CA (US); Mahesh P. Saptarshi, Milpitas, CA (US); Craig W. Hobbs, Mountain View, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1329 days.

This patent is subject to a terminal disclaimer.

(21) Appl. No.: 10/669,931

(22) Filed: Sep. 24, 2003

(51) Int. Cl.
    *G06F 11/00* (2006.01)
(52) U.S. Cl. .............................. 714/4; 714/13; 714/23; 714/47; 709/223; 709/224; 709/239
(58) Field of Classification Search ............... 714/4, 714/13, 23, 47; 709/223, 224, 239
    See application file for complete search history.

(56) References Cited

U.S. PATENT DOCUMENTS

| | | | |
|---|---|---|---|
| 5,852,724 A * | 12/1998 | Glenn, II et al. ............ 709/239 |
| 6,230,246 B1 | 5/2001 | Lee et al. | |
| 6,360,331 B2 * | 3/2002 | Vert et al. ...................... 714/4 |
| 6,421,777 B1 | 7/2002 | Pierre-Louis et al. | |
| 6,438,642 B1 | 8/2002 | Shaath | |
| 6,493,811 B1 | 12/2002 | Blades et al. | |
| 6,526,521 B1 * | 2/2003 | Lim .............................. 714/4 |
| 6,629,266 B1 * | 9/2003 | Harper et al. ................. 714/38 |
| 6,754,781 B2 | 6/2004 | Chauvel et al. | |
| 6,799,316 B1 | 9/2004 | Aguilar et al. | |
| 6,922,791 B2 * | 7/2005 | Mashayekhi et al. ........... 714/4 |
| 6,944,788 B2 * | 9/2005 | Dinker et al. .................. 714/4 |
| 2003/0097422 A1 | 5/2003 | Richards et al. | |
| 2003/0126242 A1 | 7/2003 | Chang | |
| 2004/0268340 A1 | 12/2004 | Steeb et al. | |
| 2006/0053337 A1 * | 3/2006 | Pomaranski et al. ........... 714/4 |

OTHER PUBLICATIONS

Veritas Software Corporation, "Comprehensive Application Performance Management with Veritas i[3]™," 2003, 3 pages.
Veritas Software Corporation, "Veritas Enterprise Server Automation," 2003, 8 pages.

(Continued)

*Primary Examiner*—Emerson C Puente
(74) *Attorney, Agent, or Firm*—Lawrence J. Merkel; Meyertons, Hood, Kivlin, Kowert & Goetzel, P.C.

(57) ABSTRACT

In one embodiment, a method includes detecting that an application in a first node is to failover; provisioning a second node to execute the application responsive to the detecting; and failing the application over from the first node to the second node. Additionally, embodiments comprising computer accessible media encoded with instructions which, when executed, implement the method are contemplated. In another embodiment, a system comprising a plurality of nodes. A first node of the plurality of nodes is configured to monitor performance of an application executing on a second node of the plurality of nodes during use. In response to a detection that the application is to failover from the first node, a third node is configured to be provisioned to execute the application. The application is failed over to the third node during use.

38 Claims, 10 Drawing Sheets

OTHER PUBLICATIONS

Veritas Software Corporation, "Server Consolidation with Veritas OpForce; Optimizing your Infrastructure Availability and Utilizations," 2003, 6 pages.

Veritas Software Corporation, "Server Automation with Veritas OpForce; Enterprise Operations Automation-Enhancing Workflows, Administration, and Management," 2003, 6 pages.

Veritas Software Corporation, "Rapid Server Deployment with Veritas OpForce; The Enterprise-Scale, Server Deployment Solution for Heterogeneous Environments," 2003, 6 pages.

Veritas Software Corporation, "High Availability Clustering in a Microsoft Windows Environment; Veritas Cluster Server for Microsoft Windows NT" 2000, 20 pages.

Veritas Software Corporation, "Veritas Cluster Server v2.0; Technical Overview," 2001, 12 pages.

Veritas Software Corporation, "Managing Application Availability with Application Clustering and the Veritas Cluster Server Version 2.0," 2002, 32 pages.

* cited by examiner

PROVIDING HIGH AVAILABILITY FOR AN APPLICATION BY RAPIDLY PROVISIONING A NODE AND FAILING OVER TO THE NODE

BACKGROUND OF THE INVENTION

1. Field of the Invention

This invention is related to providing high availability for an application.

2. Description of the Related Art

Certain applications are often required to be available virtually uninterrupted, either 24 hours a day or at least during working hours. Various efforts have been undertaken to provide high availability services to support the high availability of such applications. Such highly-available applications may include email servers, web servers, databases, etc.

Typically, efforts to provide high availability for a given application have focused on detecting that the application has failed on a system, and getting the application re-started on the same system or a different system. Clustering solutions have been attempted in which a group of computer systems are clustered using specialized software (referred to as a cluster server) to control the group of computer systems. A given application executes on a first computer system of the cluster, and the cluster server monitors the operation of the application. If the cluster server detects that the application has failed, the cluster server may close the application on the first computer system and restart the application on another computer system in the cluster. While clustering solutions have had success in providing high availability, these solutions may result in low utilization of the computer systems in the cluster that are not actively executing the application. Generally, each of the computer systems in the cluster may have the resources required to execute the application (e.g. proper operating system, drivers, etc. including having the proper versions of the various software). Thus, applications requiring differing resources may not typically execute on the same cluster. For example, the resources for different applications may conflict (e.g. different operating systems, different drivers, or different versions of the foregoing). In some cases, applications requiring similar resources may execute on the same cluster, but in many cases the utilization may be low.

SUMMARY OF THE INVENTION

In one embodiment, a method includes detecting that an application in a first node is to failover; provisioning a second node to execute the application responsive to the detecting; and failing the application over from the first node to the second node. Additionally, embodiments comprising computer accessible media encoded with instructions which, when executed, implement the method are contemplated. In some cases, the attempt to failover the application may not succeed. In some other cases, after failing over to the newly-provisioned node, performance may not improve to the desired level. If the failover does not succeed or does not lead to the desired performance, the method may be repeated to failover again. If no eligible node is available to failover to, and the failover is attempted due to a lack of performance on the current node, then execution may continue on the current node. On the other hand, if no eligible node is available to failover to and the failover is attempted due to a failure on the current node, then a system administrator may be notified so that the system administrator may take remedial action to get the application started again.

In another embodiment, a system comprising a plurality of nodes. A first node of the plurality of nodes is configured to monitor performance of an application executing on a second node of the plurality of nodes during use. In response to a detection that the application is to failover from the first node, a third node is configured to be provisioned to execute the application. The application is failed over to the third node during use.

BRIEF DESCRIPTION OF THE DRAWINGS

The following detailed description makes reference to the accompanying drawings, which are now briefly described.

Figure 1:
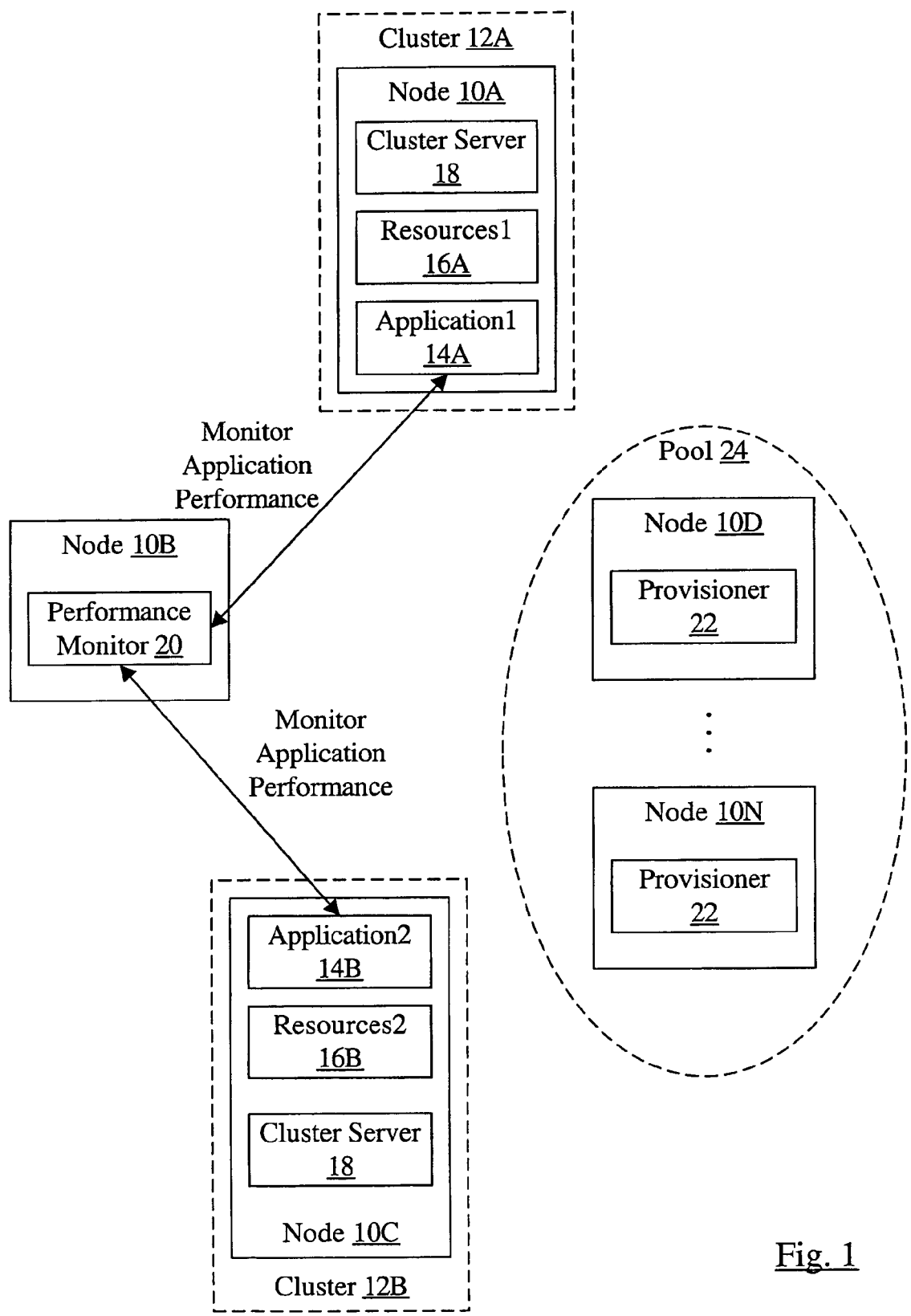
FIG. 1 is a block diagram of a set of nodes executing an application and monitoring the performance thereof.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIGS. 1-5 illustrate one embodiment of a plurality of nodes 10A-10N operating to provide high-availability for various applications (e.g. a first application, application1 14A, and a second application, application2 14B). As used herein, an application may comprise any software program. Each application uses a corresponding set of resources (e.g. resources1 16A corresponding to the application1 14A and resources2 16B corresponding to the application2 14B). Each application is executing in a cluster (e.g. cluster 12A for the application1 14A and cluster 12B for the application2 14B) managed by a cluster server 18 executing on the nodes in the clusters. Additionally, a node 10B is executing a performance monitor 20 that monitors the performance of the applications 14A-14B. A pool 24 of nodes (e.g. including nodes 10D-10N in FIG. 1) is also shown, with a provisioner 22 executable on those nodes in the pool 24. Other embodiments may have the provisioner 22 executing on an image repository node, rather than various nodes in the pool 24, as discussed in further detail below. In some other embodiments, the provisioner 22 may be installed on each node 10A-10N and may be executed to provision each node 10A-10N as desired.

Generally, each application 14A-14B may execute in a cluster 12A-12B that includes relative few nodes 10A-10N. For example, in the illustrated embodiment of FIGS. 1-5, each cluster 12A-12B may include one node when executing in steady state (e.g. not in the process of failing over the application to a new node). Since few nodes 10A-10N are included in the cluster 12A-12B, use of the nodes in the clusters may be more efficient. For example, if the clusters 12A-12B include a single node executing the application 14A-14B, then no nodes are idle in the clusters 12A-12B. Other nodes 10A-10N may be in the pool 24. The nodes in the pool 24 may be available to be provisioned to execute any application. Viewed in another way, the nodes 10A-10N in the pool 24 may be available to join any cluster 12A-12B, as desired, to fail over an application executing on that cluster 12A-12B. Thus, fewer total nodes may be implemented in a system including multiple clusters for multiple applications, as the nodes used to failover applications may be effectively shared among the clusters. Still further, in some embodiments, the nodes 10A-10N in the pool 24 may actually be executing other applications, but may also be considered to be available for joining one of the clusters 12A-12B (e.g. the applications being executed by the nodes 10A-10N in the pool 24 may be considered to be lower priority than the applications executing in the clusters 12A-12B). Thus, the nodes available for failing over the applications 14A-14B may be used to perform other useful work while awaiting the decision to failover one of the applications 14A-14B.

Generally, if the application 14A-14B executing in a cluster 12A-12B is to fail over, a node 10A-10N from the pool 24 may be selected to join the cluster 12A-12B. The provisioner 22 may provision the node with the resources 16A-16B used by the application 14A-14B and the selected node 10A-10N may join the cluster 12A-12B. The application 14A-14B may be failed over to the selected node. Optionally, the node 10A-10N from which the application fails away may exit the cluster and be returned to the pool 24. In this manner, the node may become available to perform other useful work, or to join a cluster 12A-12B in which an application is to failover.

The cluster server 18 may be designed to manage a cluster and to provide for failover of an application or applications executing in the cluster. For example, the cluster server 18 may provide for checkpointing an application's state so that, if a failover occurs, the application may begin executing at the checkpoint. Alternatively, the application may be started from a default initial state without using a checkpoint, if desired, or using an application's internal checkpointing functionality, if the application includes such functionality. Additionally, the cluster server 18 may perform the failover of the application to another node in the cluster (e.g. a node added to the cluster after being provisioned with the resources used by the application). As used herein, the term "failover" refers to resuming execution of an application on another node than a previous node on which the application was executing. The application may be resumed using a state checkpointed from the previous node or may restart with a default initial state, relying on the application's internal checkpointing functionality, in some embodiments. The application may have experienced a failure (e.g. a crash or a hang) on the previous node, a problem on the previous node may be detected prior to failure, the performance on the previous node may be less than desired, or the node hardware may be unavailable due to system outage or due to a network outage in the network to the node. If the application is still executing on the previous node when a failover occurs, the application execution may be terminated on the previous node as part of the failover. In one implementation, the cluster server may be the VERITAS Cluster Server™ product available from VERITAS Software Corporation (Mountain View, Calif.).

The performance monitor 20 may be configured to monitor the performance of the application executing on a given node. In various embodiments, the performance measured for the application may include hardware and/or software measurements. The performance monitor 20 may monitor performance in any desired fashion. For example, if the application being monitored receives requests from other nodes and provides responses to the request, the performance monitor 20 may transmit a test request to the application and measure the response time (i.e. the amount of time between transmitting the request and receiving the corresponding response), and may check the response for correctness. For example, the application may be a database such as Oracle or SQL, and a test query to the database may be transmitted. In another example, the performance monitor 20 may measure the response time to requests made by actual users. In another example, the application may update one or more shared storage devices during execution, and the performance monitor 20 may monitor updates to the shared storage to monitor performance. For example, many filesystems record updates in an intent log, and the performance monitor 20 may monitor updates to the intent log. In yet another example, the performance monitor 20 may include a module (often referred to as an "agent") that executes on the node that is executing the application and which monitors performance within the node and communicates with the performance monitor software on the node 10B. The performance monitor 20 may detect a lack of performance if the agent fails to continue communicating with the performance monitor 20, or if the communicated performance metrics indicate less than the desired performance level. The agent may monitor various aspects of the node (e.g. the amount of paging occurring on the node, memory usage, table space for applications such as a database, input/output (I/O) rates, and/or CPU execution). In still other examples, combinations of any of the above techniques and other techniques may be used by the performance monitor 20. An example of the performance monitor 20 may be the Precise I$^3$™ product available from VERITAS Software Corporation.

The provisioner 22 may be configured to provision a node with the resources used by an application, so that the node may be used to execute the application. As used herein, the term "resources" may include any software and/or hardware that the application requires to have in place in order to execute (e.g. a specific operating system (O/S), specific filesystem, various drivers, dynamically loadable libraries, other applications, etc.). Additionally, specific versions of some of the software may be required. In some embodiments, resources may also include configuration aspects of the node, such as the Internet protocol (IP) address of the node, the operating system services that are activated, hardware that is to be activated or configured in a particular fashion, etc.). As used herein, the term "provisioning" may include activating the resources used by the application on a node. Provisioning may also include, in some embodiments, installing resources on the node. For example, in some embodiments, the provisioner 22 may have access to various system images, which include all the resources used by an application. The provisioner 22 may install the image on a node (overwriting any previous provision of the node) and reboot the node with the new image. The image may be provided from an image repository node, and the provisioner 22 may transfer the image over a network to the node. In other embodiments, each of the desired images may be installed on the node and the provisioner 22 may select the image to be booted. In still other embodiments, the node may be configured with multiple boot capability, in which the local storage of the node is partitioned into two or more bootable partitions, each of which includes one of the various images. In such embodiments, the provisioner 22 may reboot the node and select the desired image. In other embodiments, the nodes may be coupled to shared storage having the images, and the provisioner 22 may change which image on the shared storage that the node is to boot from. In some implementations, the shared storage may be a storage area network (SAN), network attached storage (NAS), or small computer systems interface over TCP/IP (iSCSI) disk, and the provisioner 22 may change the configuration of the SAN, NAS, or iSCSI such that different disks (with different images) are configured to be the bootable disk in the SAN/NAS/iSCSI. When the node boots, the newly selected image may be used. In one embodiment, the provisioner 22 may be the OpForce™ product available from VERITAS Software Corporation.

In FIGS. 1-5 below, the provisioner 22 is shown as included in the nodes 10A-10N in the pool 24. In some embodiments, the provisioner 22 may be included in each node. In other embodiments, the provisioner 22 may not be included in each node, but instead may be included in a separate node which communicates with the nodes 10A-10N to provision the nodes 10A-10N as desired. For example, the provisioner 22 may execute on an image repository node that also store the images of the resources used by various applications. The provisioner 22 may execute on any other separate node as well.

Turning now to FIG. 1, a block diagram is shown that illustrates an initial configuration of the nodes 10A-10N for this example. In FIG. 1, the cluster 12A comprises the node 10A executing the application1 14A, and the cluster 12B comprises the node 10C executing the application2 14B. Each of the applications 14A-14B uses respective resources 16A-16B. The applications 14A-14B may be different applications, and thus may use different resources 16A-16B (that is, resources1 16A and resources2 16B may differ). The node 10B is executing the performance monitor 20, which is monitoring the performance of the application1 14A executing on the node 10A and the performance of the application2 14B executing on the node 10C. The remaining nodes 10D-10N are part of the pool 24 of nodes that may be added to one of the clusters 12A-12B. As mentioned above, various nodes 10D-10N may be executing other applications, or may be idle.

Figure 2:
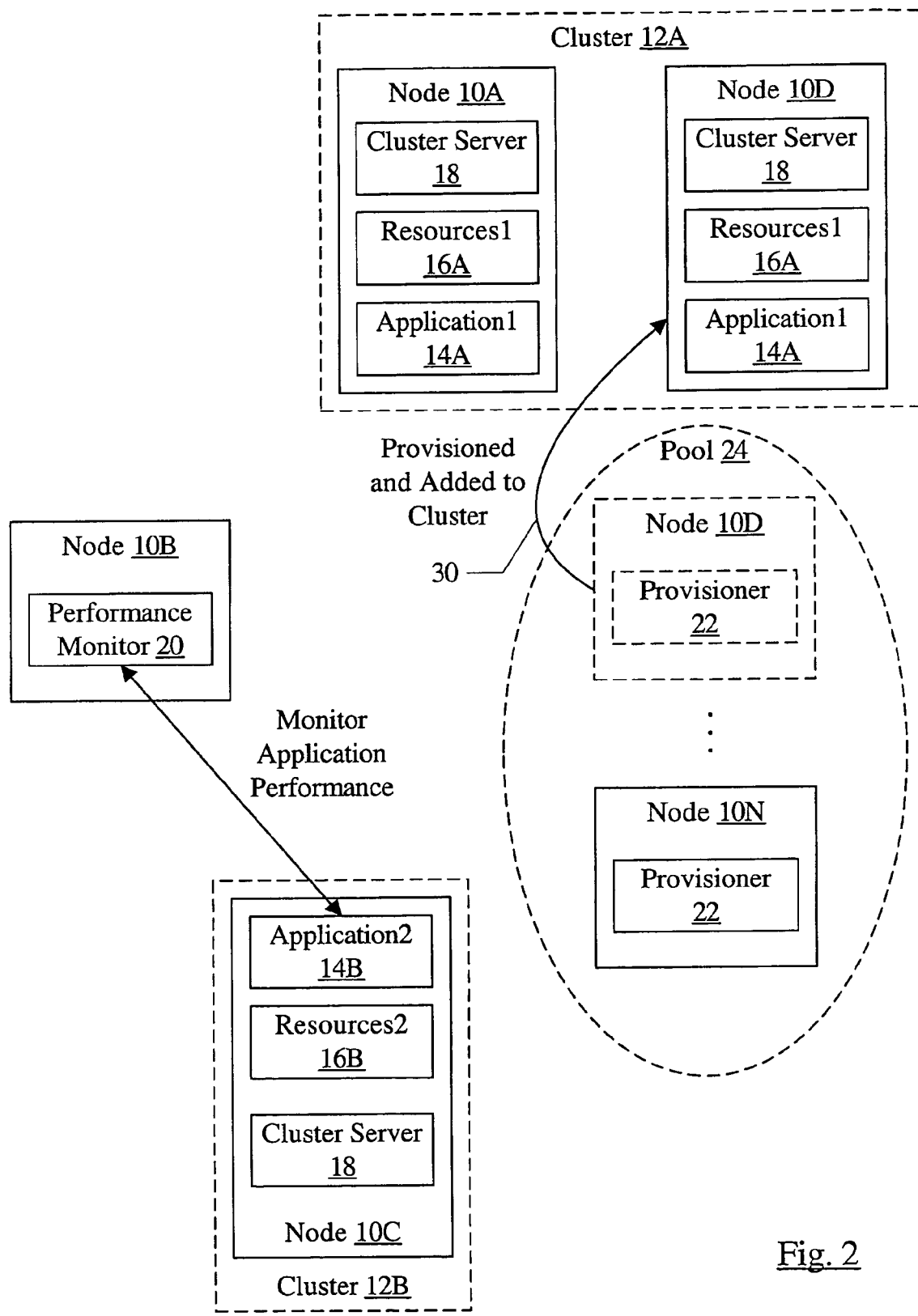
FIG. 2 is a block diagram of the set of nodes illustrating provisioning one of the nodes to execute the application and adding the node to the cluster that is executing the application.

FIG. 2 is a block diagram illustrating the nodes 10A-10N after a determination that the application1 14A is to failover from the node 10A. For example, the performance monitor 20 may detect that the performance of the application1 14A is below a desired threshold, or the cluster server 18 on the node 10A may detect a failure related to the application1 14A (including, e.g., node hardware failure or a network failure in the network to the node). In FIG. 2, the node 10D has been selected to be added to the cluster 12A. The provisioner 22 provisions the node 10D with the resources 16A, the application1 14A, and the cluster server 18. The cluster server 18 adds the node 10D to the cluster 12A (arrow 30). The node 10D is removed from the pool 24 (shown in FIG. 2 in dotted enclosure).

Figure 3:
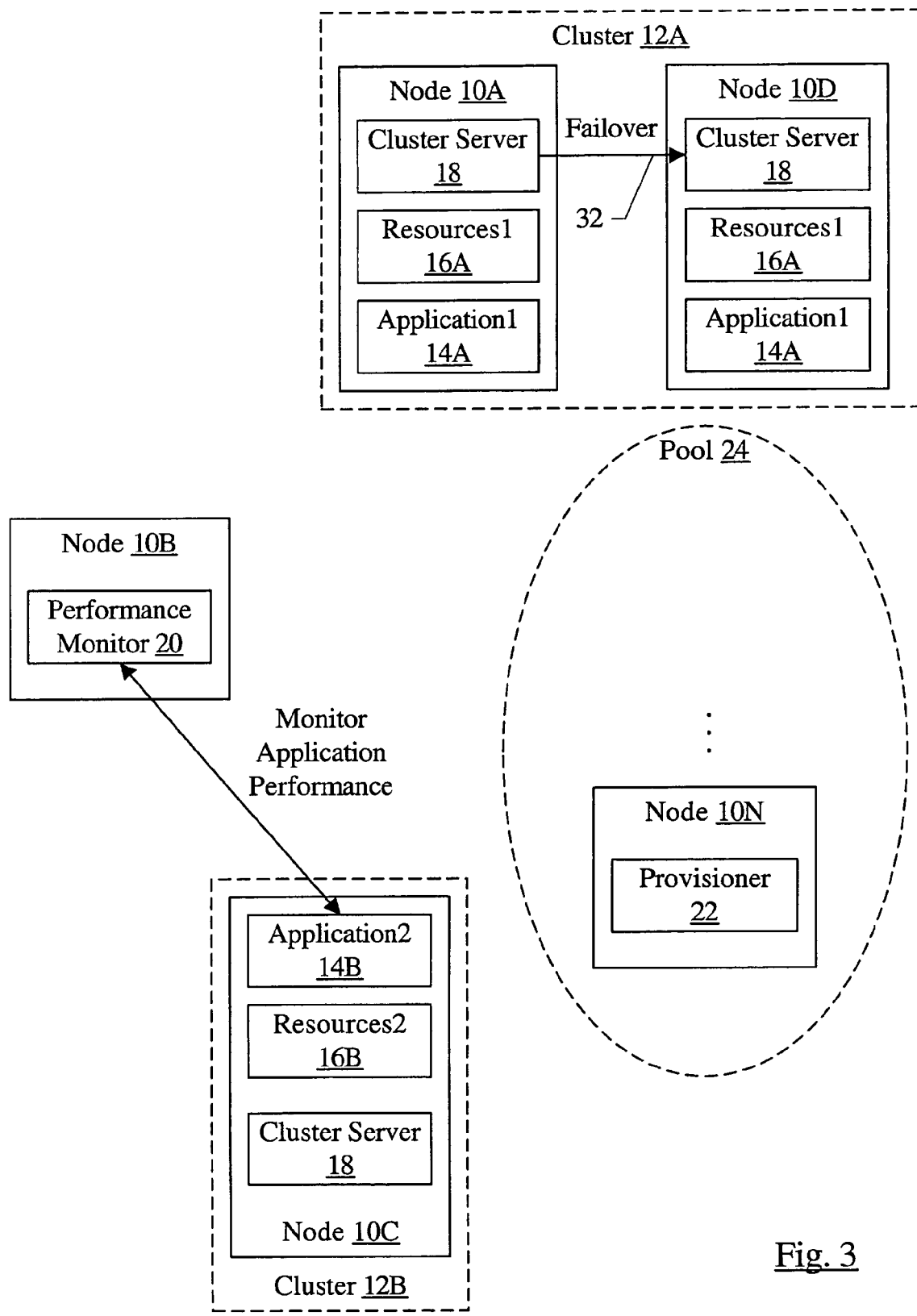
FIG. 3 is a block diagram of the set of nodes illustrating failover from the node previously executing the application to the newly-provisioned node.

FIG. 3 is a block diagram illustrating the nodes 10A-10N and the cluster server 18 failing over the application1 14A from the node 10A to the node 10D in the cluster 12A (arrow 32).

Figure 4:
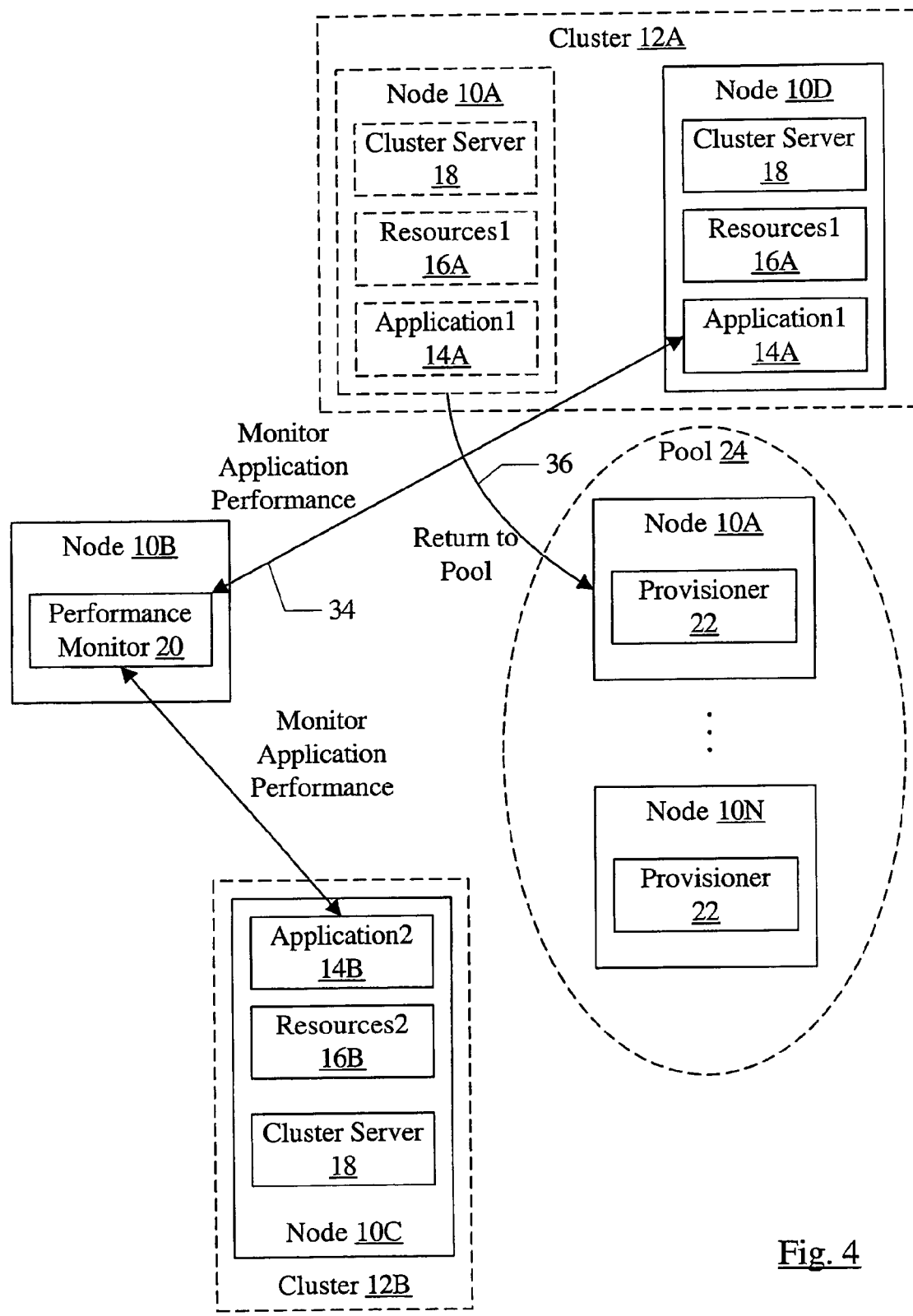
FIG. 4 is a block diagram of the set of nodes illustrating the monitoring of performance on the newly-provisioned node and return of the previous node to a pool of nodes.

FIG. 4 is a block diagram illustrating the nodes 10A-10N after the failover of the application1 14A from the node 10A to the node 10D is complete. The performance monitor 20 is illustrated monitoring the performance of the application1 14A on the node 10D (arrow 34). Additionally, in this example, the node 10A is removed from the cluster 12A (shown in dotted enclosure within the cluster 12A in FIG. 4) and returned to the pool 24 (arrow 36). The provisioner 22 may be available to execute on the node 10A to provision the node 10A for executing another application (or to be added to one of the clusters 12A-12B). Alternatively, as mentioned above, the provisioner 22 may execute on a separate node and may communicate with the node 10A to provision the node.

It is noted that, in various embodiments, the performance monitor 20 may cease monitoring the performance of the application 114A on the node 10A at any point (prior to, coincident with, or subsequent to beginning monitoring on the node 10D). While not explicitly shown in FIGS. 2 and 3, the performance monitor may be monitoring performance of the application1 14A on the node 10A in various embodiments.

Figure 5:
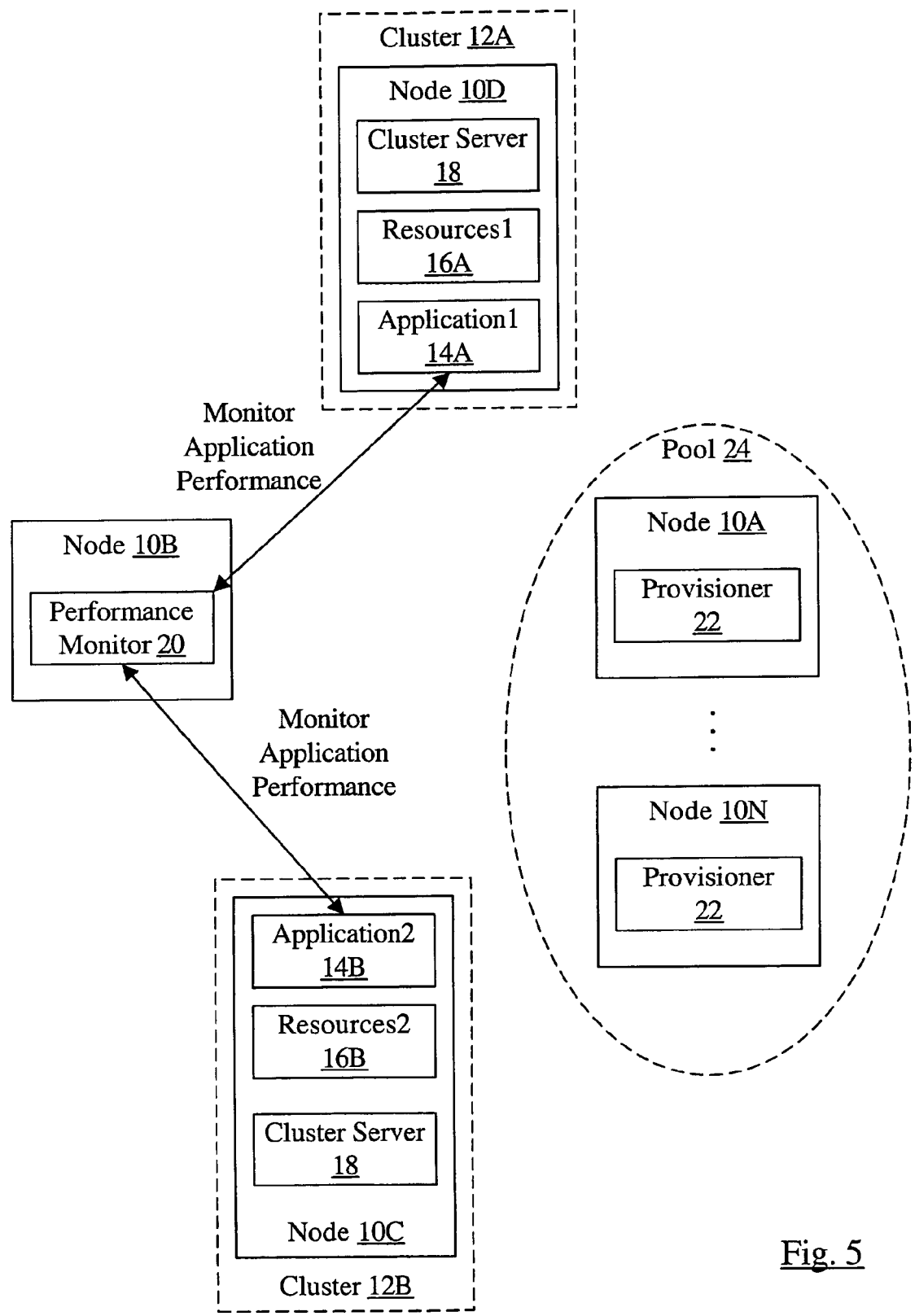
FIG. 5 is a block diagram of the set of nodes in steady state after the failover.

FIG. 5 is a block diagram illustrating the nodes 10A-10N in a new steady state, similar to FIG. 1 except that the cluster 12A includes the node 10D executing the application1 14A and the node 10A is part of the pool 24.

Throughout the time period illustrated in the example of FIGS. 1-5, the performance monitor 20 continues to monitor the performance of the application2 14B on the node 10C. In this example, the performance monitor 20 does not detect the performance of the application2 14B being below the desired threshold for the application2 14B, and thus no failover is detected. In other embodiments, more than one performance monitor 20 may be included for monitoring the performance of various applications executing in various clusters. Each performance monitor 20 may monitor the performance of one or more applications.

It is noted that, while the example of FIGS. 1-5 illustrates each of the clusters 12A-12B including a single node other than when a failover is occurring, other embodiments may include more than one node in a given cluster. An additional node may be provisioned and added to the cluster to provide for failover, to replace the failing node, or to provide a higher performance node to the cluster to execute the application, for example. An additional node or nodes may be added to a cluster to implement a policy change (e.g. more nodes may be used in a cluster during times of higher load, such as during business hours, and fewer nodes may be used in a cluster during times of lower load, such as during night hours). Thus, removing a node from a cluster when a newly provisioned node has been added may be optional.

Figure 6:
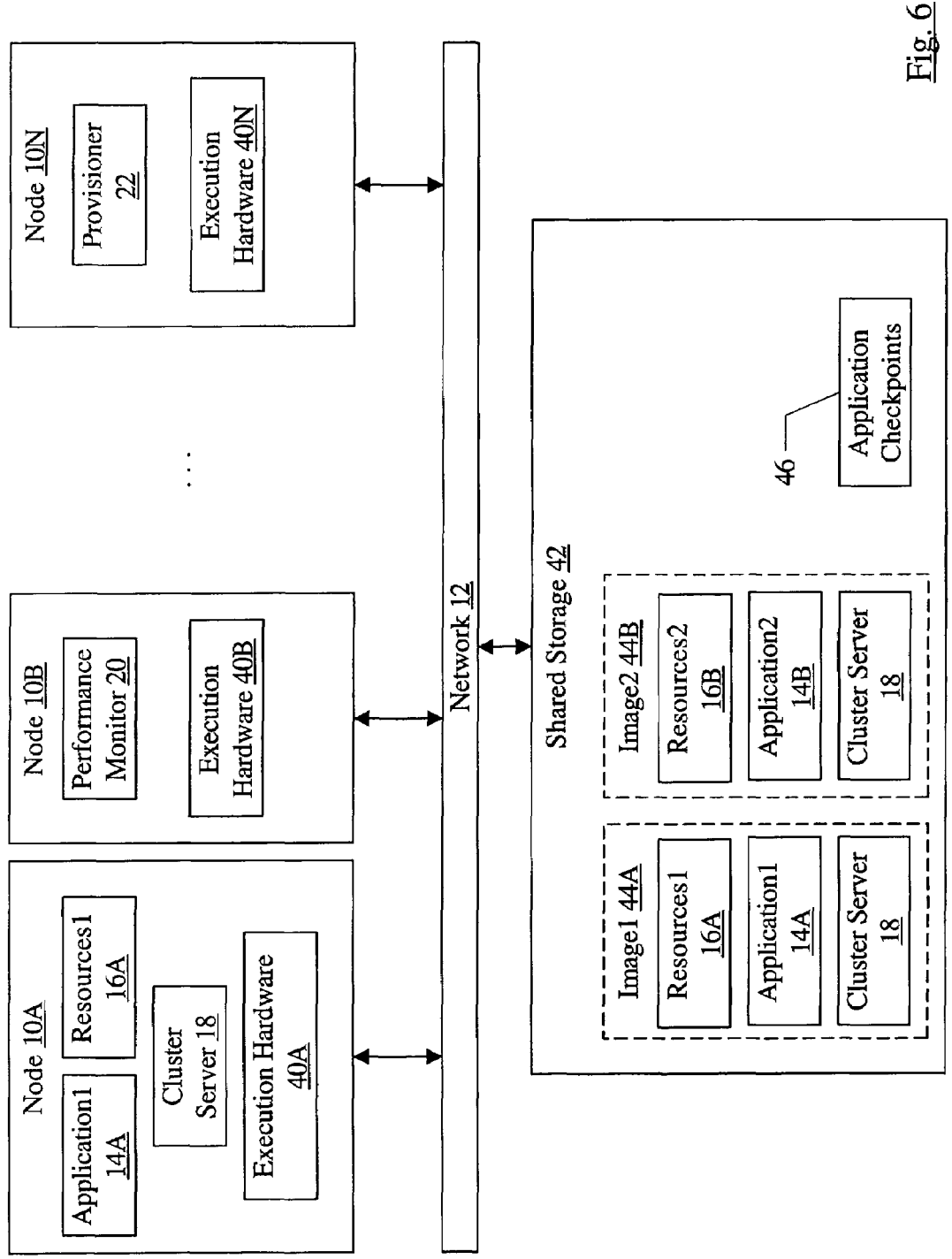
FIG. 6 is a block diagram of the set of nodes interconnected using a network in a first embodiment.

Turning now to FIG. 6, a block diagram is shown illustrating a physical view of one embodiment of the nodes 10A-10N corresponding to the state shown in FIG. 1. Each "node" may comprise a computer system. In the embodiment of FIG. 6, the nodes 10A-10N are coupled to a network 12 for communication between the nodes 10A-10N. Each of the nodes 10A-10D may include respective execution hardware 40A-40N, which may be used to execute the software in that node. For example, the execution hardware 40A may execute the application1 14A, the software resources1 16A, and the cluster server 18 when the node 10A is executing the application1 14A. The execution hardware 40B may execute the performance monitor 20. The execution hardware 40N may execute the provisioner 22. Additionally shown in FIG. 6 is a shared storage device 42 storing images 44A-44B and application checkpoints 46. The image1 44A may correspond to the application1 14A, and may include the application1 14A, the resources1 16A, and the cluster server 18. The image2 44B may correspond to the application2 14B, and may include the application2 14B, the resources2 16B, and the cluster server 18.

As mentioned above, the execution hardware 40A-40N may generally comprise hardware used to execute various software on the nodes 10A-10N. For example, the execution hardware may include one or more processors designed to execute the instructions that comprise the software (e.g. the applications 14A-14B, the resources 16A-16B, the cluster server 18, the performance monitor 20, and the provisioner 22). The execution hardware may further include local storage in the node (which may include memory such as random access memory (RAM) as well as local disk storage) and circuitry for interfacing to the network 12.

The network 12 may comprise any network technology in various embodiments. The network 12 may be a local area network, wide area network, intranet network, Internet network, wireless network, or any other type of network or combinations of the above networks. The network 12 may be designed to be continuously available (although network outages may occur), or may be intermittent (e.g. a modem connection made between a computer system in a user's home and a computer system in a user's workplace). Any network media may be used. For example, the network 12 may be an Ethernet network. Alternatively, the network may be a token ring network, a SAN, etc.

The shared storage 42 may be any type of storage accessible to each of the nodes 10A-10N. For example, the shared storage 42 may comprise NAS or SAN storage, or an iSCSI storage. In other embodiments, the shared storage 42 may be coupled to the nodes 10A-10N separate from the network 12. For example, the shared storage 42 may be coupled to a peripheral interconnect to which the nodes 10A-10N are coupled (e.g. a small computer systems interface (SCSI) interconnect, a Fibre Channel interconnect, or an iSCSI storage).

The images 44A-44B may be used by the provisioner 22 to provision various nodes to execute one of the applications 14A-14B. In the embodiment of FIG. 6, the provisioner 22 may copy the corresponding image 44A-44B across the network 12 to a node 10A-10N that is being provisioned, or may direct the node 10A-10N being provisioned to boot from one of the images 44A-44B on the shared storage 42. In other embodiments, as mentioned previously, the images 44A-44B may be installed on local storage within each node.

The application checkpoints 46 may comprise checkpoints of application state corresponding to the applications 14A-14B. The application checkpoints 46 may be created by the cluster server 18 periodically, for failing over from one node to another. Alternatively, the applications 14A-14B may create the application checkpoints 46, either using facilities provided by the cluster server 18 or creating the checkpoints directly. In yet another alternative, the applications 14A-14B may start from a default initial state without checkpointing.

It is noted that the performance monitor 20, in addition to using the network 12 to monitor application performance or instead of using the network 12, may use other mechanisms to monitor application performance. For example, if storage activity is being monitored and the storage is accessible to the node 10B (e.g. shared storage), the performance monitor 20 may monitor the activity without using the network 12.

Figure 7:
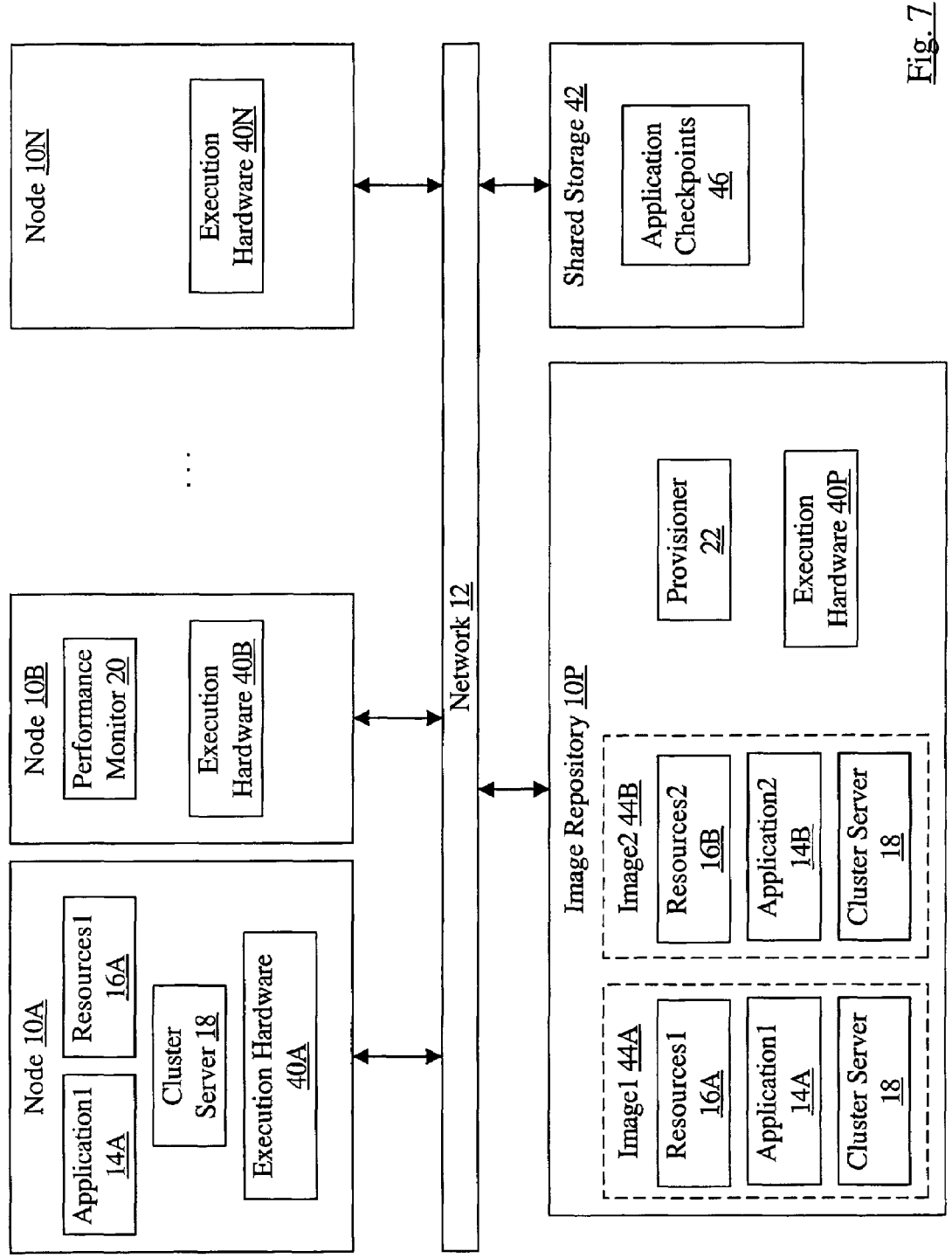
FIG. 7 is a block diagram of the set of nodes interconnected using a network in a second embodiment.

FIG. 7 is a block diagram illustrating a physical view of a second embodiment of the nodes 10A-10N corresponding to the state shown in FIG. 1. Similar to FIG. 6, the nodes 10A-10N are coupled to the network 12 and a shared storage 42 is coupled to the network 12 (or coupled to the nodes 10A-10N separate from the network 12). Additionally, an image repository node 10P is coupled to the network 12. In this embodiment, the image repository node 10P includes execution hardware 40P (similar to execution hardware 10A-10N in the other nodes 10A-10N). The execution hardware 40P may execute the provisioner 22. Additionally, the image repository node 10P stores the images 44A-44B. The provisioner 22 may transmit the images 44A-44B from the image repository node 10P to a node 10A-10N to provision that node 10A-10N with the resources included in the image 44A-44B.

Figure 8:
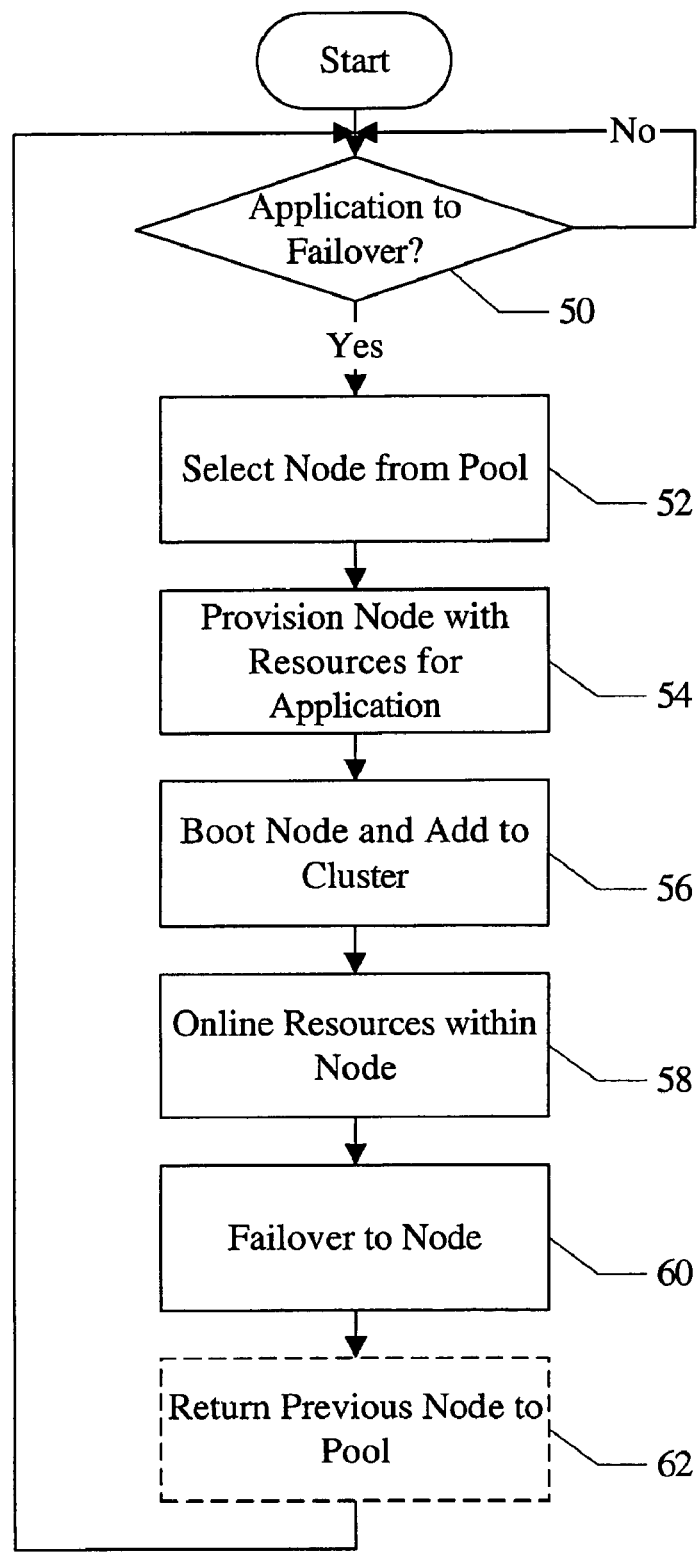
FIG. 8 is a flowchart illustrating one embodiment of failing over an application to a newly-provisioned node.

Turning next to FIG. 8, a flowchart is shown illustrating one embodiment of failing over an application to a newly provisioned node. In one embodiment, the blocks shown in FIG. 8 may be implemented by instructions included in one or more of the cluster server 18, the performance monitor 20, and the provisioner 22. That is, the instructions, when executed, may perform the operation shown in the blocks of FIG. 8.

Figure 9:
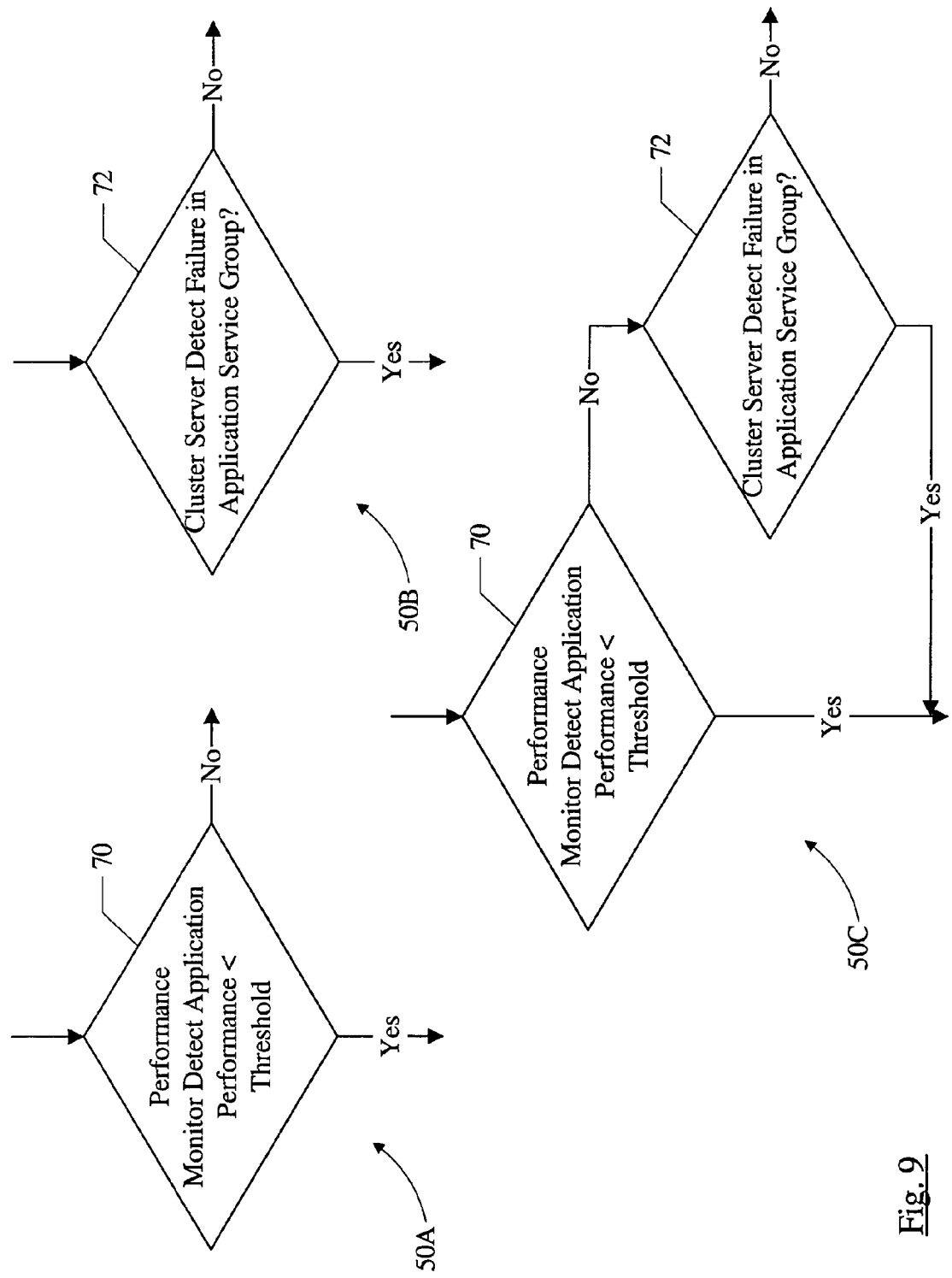
FIG. 9 is a set of flowcharts illustrating exemplary embodiments of a decision block shown in FIG. 8.

A determination is made as to whether the application is to failover (decision block 50). In some embodiments, decision block 50 may be implemented by the performance monitor 20 (e.g. based on the performance of the application on the current node). In other embodiments, decision block 50 may be implemented by the cluster server 18 (e.g. based on detecting a failure in the application's service group). In yet other embodiments, decision block 50 may be implemented in a combination of the performance monitor 20 and the cluster server 18. Various embodiments of the decision block 50 are shown in FIG. 9 and described in more detailed below. If the application is not to failover (decision block 50, "no" leg), monitoring of the application continues.

If the application is to fail over (decision block 50, "yes" leg), a node 10A-10N is selected from the pool 24 (block 52). In one embodiment, the provisioner 22 may select the node. Alternatively, the cluster server 18 or the performance monitor 20 may select the node. The selected node may have hardware sufficient to execute the application. That is, the application may require specific hardware (e.g. a specific type of network interface hardware or a specific type of other I/O device). The selected node may include the required hardware. The application may require hardware having at least a minimum specification, and the selected node may have at least the minimum specification. For example, a given application may require a minimum level of processor performance to execute properly and/or with the desired performance. The selected node may include at least the minimum level of performance. Similarly, a given application may require a minimum amount of memory and/or other local storage, and the selected node may include at least the minimum level. A node have sufficient hardware to execute the application may be referred to as an "eligible node".

The selection of a node may be performed in a variety of fashions. For example, if the pool 24 may include nodes that are currently executing other applications, the selection may attempt to select an idle eligible node first and, if no such idle eligible node is available, an eligible node executing an application may be selected. The applications may have priorities assigned, and the eligible node executing the lowest priority application among the eligible nodes may be selected. In other embodiments, if failover is occurring because the current node that is executing the application is not providing high enough performance, a node having better capabilities may be selected.

The provisioner 22 may provision the selected node with the resources for the application (block 54). The provisioner 22 may then boot the newly provisioned node, and the cluster server 18 may add the node to the cluster 12A-12B corresponding to the application 14A-14B that is to failover (block 56). The newly provisioned node may online the resources used by the application (block 58). A resource is "onlined" in this context if it is operating in the fashion required by the application and is being tracked by the cluster server 18. The cluster server 18 then fails the application over to the newly provisioned node (block 60). Optionally, the node that is failed away from (the "previous node") may be returned to the pool (block 62). Monitoring of the application (now executing on the newly provisioned node) then continues.

In some cases, the attempt to failover the application may not succeed. In other cases, after failing over to the newly-provisioned node, performance may not improve to the desired level. If the failover does not succeed or does not lead to the desired performance, the method of FIG. 8 may be repeated to failover again. If no eligible node is available to failover to, and the failover is attempted due to a lack of performance on the current node, then execution may continue on the current node. On the other hand, if no eligible node is available to failover to and the failover is attempted due to a failure on the current node, then a system administrator may be notified so that the system administrator may take remedial action to get the application started again.

Turning now to FIG. 9, several possible embodiments of the decision block 50 are shown. The set of embodiments shown in FIG. 9 is not meant to be exhaustive.

A first embodiment 50A of the decision block 50 may be implemented by the performance monitor 20. In the embodiment 50A, the performance monitor 20 determines whether or not the performance of the application is less than a desired threshold (decision block 70). The threshold may be programmable or fixed, and may depend on how the performance of the application is measured. In some embodiments, the performance monitor 20 may determine if the performance is below the threshold continuously for at least a predefined length of time (which may be programmable or fixed). The "yes" leg of the decision block 70 may be the "yes" leg of the decision block 50 for the embodiment 50A, and similarly the "no" leg of the decision block 70 may be the "no" leg of the decision block 50 for the embodiment 50A.

A second embodiment 50B may be implemented by the cluster server 18. In the embodiment 50B, the cluster server 18 determines whether or not a failure is detected in the application's service group (decision block 72). The application's service group may generally include the resources of that application, as well as the hardware in the node that is used by the application during execution. The "yes" leg of the decision block 72 may be the "yes" leg of the decision block 50 for the embodiment 50B, and similarly the "no" leg of the decision block 72 may be the "no" leg of the decision block 50 for the embodiment 50B.

A third embodiment 50C may be the combination of the above two embodiments. If either the performance monitor 20 detects performance below a threshold (decision block 70) or the cluster server 18 detects a failure in the application's service group (decision block 72), then the application is to fail over. In the third embodiment 50C, the decision blocks 70 and 72 may be performed in parallel by the performance monitor 20 and the cluster server 18, respectively, with a "yes" result from either block resulting in the "yes" leg of decision block 50 and a "no" result from both blocks resulting in the "no" leg of the decision block 50.

Figure 10:
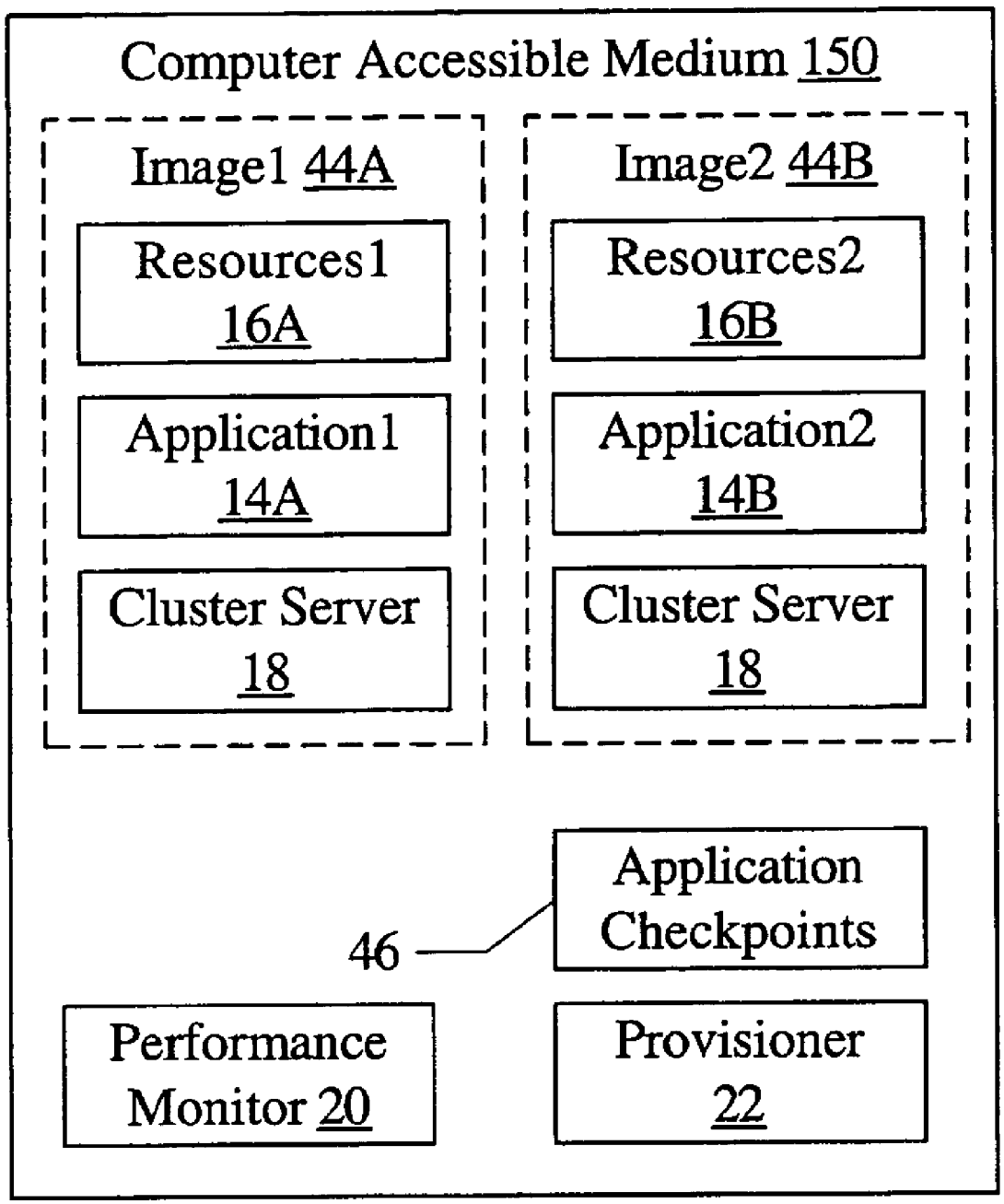
FIG. 10 is a block diagram of one embodiment of a computer accessible medium.

Turning now to FIG. 10, a block diagram of a computer accessible medium 150 is shown. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link. The computer accessible medium 150 in FIG. 10 may be encoded with one or more of the images 44A-44B (including the resources 16A-16B, the applications 14A-14B, and/or the cluster server 18 as shown in FIG. 10) the application checkpoints 46, the provisioner 22, and/or the performance monitor 20. Generally, the computer accessible medium 150 may store any set of instructions which, when executed, implement a portion or all of the flowcharts shown in one or more of FIGS. 8-9. In some embodiments, the computer accessible medium 150 may comprise one or more of shared storage 42 accessible to the nodes 10A-10N, storage included in the nodes 10A-10N, storage on removable media accessible to the nodes 10A-10N (at least temporarily), or any combination thereof.

It is noted that, while the performance monitor 20, the cluster server 18, and the provisioner 22 have been described as software executing on various nodes, one or more of the above may be implemented partially in software and partially in hardware in the respective nodes, or wholly in hardware in the respective nodes, in various embodiments.

Numerous variations and modifications will become apparent to those skilled in the art once the above disclosure is fully appreciated. It is intended that the following claims be interpreted to embrace all such variations and modifications.

What is claimed is:

1. A method comprising:
   detecting that an application in a first node is to failover, wherein the first node is included in a cluster being used to execute the application;
   adding a second node to the cluster responsive to the detecting;
   provisioning the second node to execute the application responsive to the detecting; and
   failing the application over from the first node to the second node.

2. The method as recited in claim 1 wherein the provisioning comprises activating one or more resources used by the application on the second node.

3. The method as recited in claim 1 wherein the provisioning comprises installing one or more resources used by the application on the second node.

4. The method as recited in claim 1 wherein the second node has multiple boot capability, and wherein the provisioning comprises rebooting the second node from a partition that comprises one or more resources used by the application.

5. The method as recited in claim 1 further comprising selecting the second node from a plurality of nodes.

6. The method as recited in claim 5 wherein the second node is executing a different application when selected.

7. The method as recited in claim 5 wherein the selecting comprises verifying that the second node includes hardware that is sufficient to execute the application.

8. The method as recited in claim 1 further comprising adding the first node to the plurality of nodes to be selectable for provisioning.

9. The method as recited in claim 1 wherein the detecting comprises detecting that the performance of the application executing on the first node is less than a threshold performance level.

10. The method as recited in claim 9 wherein the performance is less than the threshold performance level for at least a predefined time interval.

11. The method as recited in claim 9 wherein the detecting comprises alternatively detecting a failure in a service group including the application.

12. The method as recited in claim 1 wherein the detecting comprises detecting a failure in a service group including the application.

13. The method as recited in claim 1 further comprising detecting a lack of success in the failing over.

14. The method as recited in claim 13 further comprising:
provisioning a third node to execute the application responsive to detecting the lack of success; and
failing the application over from the second node to the third node.

15. The method as recited in claim 1 further comprising:
determining that a performance level on the second node is less than a threshold;
provisioning a third node to execute the application responsive to the determining; and
failing the application over from the second node to the third node.

16. The method as recited in claim 1 further comprising removing the first node from the cluster responsive to successfully failing over the application to the second node.

17. A method comprising:
detecting that an application in a first node is to failover;
provisioning a second node to execute the application responsive to the detecting;
attempting to failover the application from the first node to the second node;
detecting a lack of success in the failover, wherein the lack of success is due to a lack of an eligible node; and
permitting the application to execute on the first node responsive to the lack of the eligible node if the attempt to failover is due to a performance of the application on the first node being less than a threshold performance level.

18. The method as recited in claim 17 wherein, if the attempt to failover is due to a failure in a service group including the application, the method further comprises notifying an administrator.

19. A computer accessible medium encoded with instructions that, when executed:
detect that an application in a first node is to failover, wherein the first node is included in a cluster being used to execute the application;
add a second node to the cluster responsive to detecting that the application is to failover;
provision the second node to execute the application responsive to detecting that the application is to failover; and
failover the application from the first node to the second node.

20. The computer accessible medium as recited in claim 19 wherein the instructions which, when executed, provision the second node comprise instructions which, when executed, activate one or more resources used by the application on the second node.

21. The computer accessible medium as recited in claim 19 wherein the instructions which, when executed, provision the second node comprise instructions which, when executed, install one or more resources used by the application on the second node.

22. The computer accessible medium as recited in claim 19 wherein the second node has multiple boot capability, and wherein the instructions which, when executed, provision the second node comprise instructions which, when executed, reboot the second node from a partition that comprises one or more resources used by the application.

23. The computer accessible medium as recited in claim 19 wherein the instructions, when executed, select the second node from a plurality of nodes.

24. The computer accessible medium as recited in claim 23 wherein the instructions which, when executed, select the second node comprise instructions which, when executed, verify that the second node includes hardware that is sufficient to execute the application.

25. The computer accessible medium as recited in claim 23 wherein the instructions, when executed, add the first node to the plurality of nodes to be selectable for provisioning.

26. The computer accessible medium as recited in claim 19 wherein the instructions which, when executed, detect that the application is to failover comprise instructions which, when executed, detect that the performance of the application executing on the first node is less than a threshold performance level.

27. The computer accessible medium as recited in claim 26 wherein the performance is less than the threshold performance level for at least a predefined time interval.

28. The computer accessible medium as recited in claim 26 wherein the instructions which, when executed, detect that the application is to failover comprise instruction which, when executed, alternatively detect a failure in a service group including the application.

29. The computer accessible medium as recited in claim 19 wherein the instructions which, when executed, detect that the application is to failover comprise instruction which, when executed, detect a failure in a service group including the application.

30. The computer accessible medium as recited in claim 19 wherein the instructions, when executed, remove the first node from the cluster responsive to successfully failing over the application to the second node.

31. A system comprising a plurality of nodes, wherein a first node of the plurality of nodes is configured to monitor performance of an application executing on a second node of the plurality of nodes during use, and wherein, in response to a detection that the application is to failover from the first node, a third node is configured to be provisioned to execute the application, wherein the second node is included in a cluster being used to execute the application, and wherein the third node is added to the cluster responsive to the detection that the application is to failover from the second node during use, and wherein the application is failed over to the third node during use.

32. The system as recited in claim 31 wherein provisioning the third node comprises activating one or more resources used by the application on the second node.

33. The system as recited in claim 31 wherein provisioning the third node comprises installing one or more resources used by the application on the third node.

34. The system as recited in claim 31 wherein the third node has multiple boot capability, and wherein provisioning the third node comprises rebooting the third node from a partition that comprises one or more resources used by the application.

35. The system as recited in claim 31 wherein the first node is configured to detect that the performance of the application executing on the second node is less than a threshold performance level.

36. The system as recited in claim 35 wherein the performance is less than the threshold performance level for at least a predefined time interval.

37. The system as recited in claim 31 wherein the second node is configured to detect a failure in a service group including the application, and wherein the application is to failover from the second node if the second node detects the failure.

38. The system as recited in claim 31 wherein the second node is removed from the cluster responsive to a successful failover to the third node.

* * * * *